March 18, 1952 W. H. LEWIN 2,589,830
CLUTCH AND BRAKE FOR MOTOR DRIVES
Filed June 25, 1946 2 SHEETS—SHEET 1

INVENTOR.
WILLIAM H. LEWIN
BY
J.B. Felshin
ATTORNEY

March 18, 1952  W. H. LEWIN  2,589,830
CLUTCH AND BRAKE FOR MOTOR DRIVES
Filed June 25, 1946                                            2 SHEETS—SHEET 2

INVENTOR.
WILLIAM H. LEWIN
BY
J. B. Felshin
ATTORNEY

Patented Mar. 18, 1952

2,589,830

UNITED STATES PATENT OFFICE 2,589,830

CLUTCH AND BRAKE FOR MOTOR DRIVES

William H. Lewin, New York, N. Y.

Application June 25, 1946, Serial No. 679,209

13 Claims. (Cl. 192—18)

This invention relates to motor drive.

Machines such as sewing machines are usually driven from a common motor drive which supplies power to a plurality of such machines. Where individual motor drive is used, that is, where one machine is driven by one motor, it is necessary to provide a clutch between the motor and the machine, so that the motor could be started and the machine clutched thereto when the motor is running at full speed. Such individual drive motors as heretofore constructed have been quite cumbersome and as heretofore designed necessitated relatively large space. It is therefore an object of this invention to provide a highly improved and compact individual motor drive for sewing machines or the like, comprising a clutch and brake which can be built into a standard size electric motor without increasing the overall dimensions of the motor.

Yet another object of this invention is to provide an individual motor drive of the character described comprising an armature shaft of the motor, a fly wheel thereon provided with a friction liner, a brake friction liner attached to the motor casing, a sleeve slidable in the motor bearing housing disposed about the armature shaft, a pulley wheel mounted on said sleeve by means of a ball bearing, and means to shift said sleeve in one direction to engage the pulley with the fly wheel and in an opposite direction to engage the pulley with the brake.

A still further object of this invention is to provide, in an individual motor drive of the character described, a combination radial and thrust bearing for the armature shaft to permit a clearance between said shaft and the shiftable sleeve thereon so as to eliminate friction between said sleeve and shaft.

Yet a further object of this invention is to provide a compact and rugged individual motor drive of the character described, which shall occupy a minimum of space, which shall be relatively inexpensive to manufacture, simple to control, smooth and positive in operation, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown various possible illustrative embodiments of this invention, Fig. 1 is an end view of an individual motor drive embodying the invention;

Figure 1:
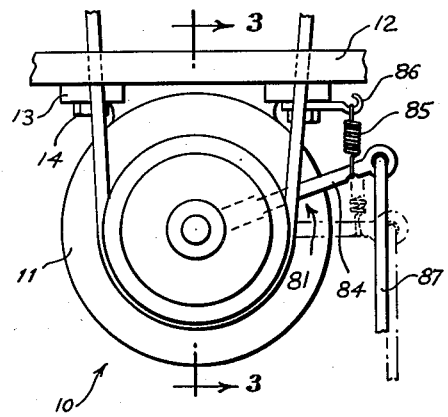
Figure 2:
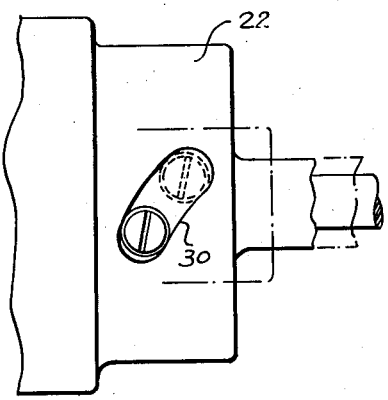
Fig. 2 is a partial side elevational view thereof.

Referring now in detail to the drawing, 10 designates an individual motor drive embodying the invention. The same comprises a motor 11 which may be hung or supported from any suitable support 12. The motor 10 is provided with legs 13 which may be bolted as at 14 to the support 12. The motor 11 comprises an outer casing 15 of usual construction and an armature shaft 16. Attached to one end of the casing 15 is a fixed bonnet or end member 17. The bonnet 17 has a cylindrical portion 20 running into an annular flat portion 21. Extending from said portion 21 is an annular thickened boss or hub 22. Wall 20 is formed with a through opening 23 having an enlarged portion 24 disposed within the boss 22. Opening 23 may be counter-sunk as at 25, at the inside of the motor. The boss 22 is formed at opposite sides thereof with a pair of part helical slots 30 and 31. Said slots cross one another and are so located that any line perpendicular to and intersecting the axis of said hub 22 and passing through slot 30 will also pass through slot 31.

Extending from the armature shaft 16 of the motor is a reduced portion 34 integral therewith, forming a shoulder 35. On shaft portion 34 is a thrust bearing 36 contacting the shoulder 35 and also received within the countersunk opening 25, thereby providing a bearing to take up thrust imposed on the motor shaft 16 in the direction of the fly wheel as will appear hereinafter.

For the purpose hereinafter appearing, there is attached to the outer surface 40 of the hub 22, a metal plate 41. The plate 41 may be attached to the hub by means of screws 42. Attached to the metal plate 41 is a flat, ring-like friction brake lining 44. Brake lining 44 may be attached to the plate by means of screws 45. Keyed to the outer end of extension shaft 34, as by means of key 50, is a fly wheel 51. Attached to the inner surface 52 of said fly wheel is an annular flat, ring like friction liner 53. The liner may be attached to the fly wheel 51 by the screws 54. It will be noted that the brake liner 44 is parallel to and aligned with the friction liner 53 on the fly wheel. The fly wheel may be fixed to the shaft 34 by means of a set screw 56.

Slidably mounted within the opening 23, 24 of the motor end member 17, is a sleeve 60. Said sleeve 60 has a reduced portion 61 received within the opening 23 and an enlarged portion 62 received within the opening 24.

It is furthermore formed with a portion 66 of reduced diameter projecting through the central openings in the metal plate 41 and brake liner 44 and projecting therebeyond. The sleeve 60 is formed with an axial through opening 70 through which the shaft 34 passes. Said sleeve is formed with a pair of diametrically opposed radial threaded openings 72 and 73 which register with the slots 30, 31. Screwed into the threaded opening 72 is the threaded shank 74 of screw 75. The screw 75 is provided with a portion 76 extending into the opening 30, and with a slotted head 77. On portion 76 of the screw 75 is a sleeve 78. Screwed into the opening 73 is the threaded shank 80 of a rod 81. Said rod 81 has a portion 82 disposed within slot 31. On portion 82 is a sleeve 83. Extending from portion 82 is a rod portion 84 which may be connected by a coil tension spring 85 to a hook 86 fixed to one of the motor legs. Spring 85 normally tends to rotate rod 81 in a counterclockwise direction.

Attached to the outer end of rod 84 is a link 87 which may be connected to a foot pedal.

Mounted on portion 66 of sleeve 60 is a ball bearing 90 supporting a pulley 91. The pulley 91 carries a belt 92 which may be connected to a sewing machine or any other machine or object to be driven. It will be noted that the pulley 91 is disposed between the friction members 44 and 53. The pulley 91 may rotate freely on the ball bearing 90.

Figure 3:
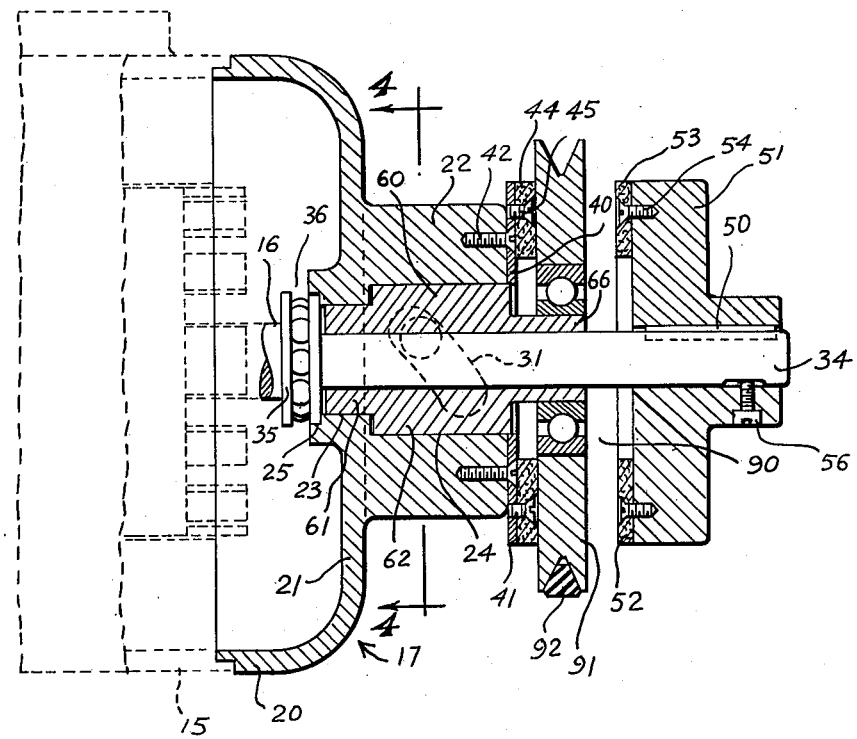
Fig. 3 is a cross-sectional view taken on line 3—3 of Fig. 1.
Figure 4:
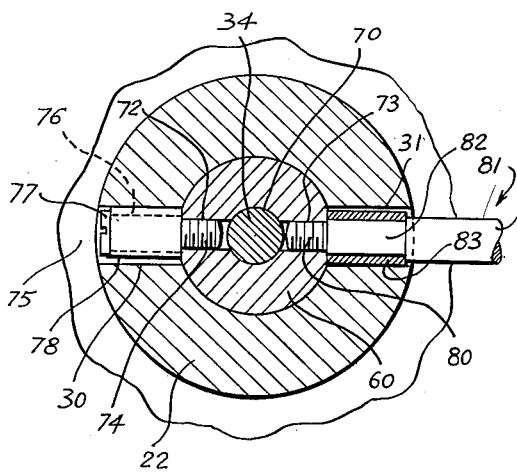
Fig. 4 is a cross-sectional view taken on line 4—4 of Fig. 3.

The operation of the drive will now be explained:

The spring 85 normally pulling rod 81 upwardly rotates the sleeve 60, and at the same time shifts said sleeve to the left looking at Fig. 3. The shift of the sleeve is due to the fact that the sleeves or rollers 78 and 83 are in the slots 30 and 31. When the rod 84 is pulled upwardly, the roller 83 will tend to move to the left end of slot 31 thereby causing the roller 78 to also move to the left end of the slot 30. The sleeve is hence shifted to the left. Such operation of the sleeve will shift the pulley 91 into contact with the friction brake 44 to normally retain the pulley in braked condition. The motor may thus rotate together with its fly wheel 51 without rotating the pulley 91 or the machine to which it is belted. When it is desired to rotate the pulley 91, the link or rod 87 is pulled downwardly thereby serving to rotate sleeve 60 in a clockwise direction, looking at Fig. 1, and causing said sleeve to be shifted to the right, looking at Fig. 3. Such operation will move the pulley 91 into contact with the rotating fly wheel 51.

Figure 7:
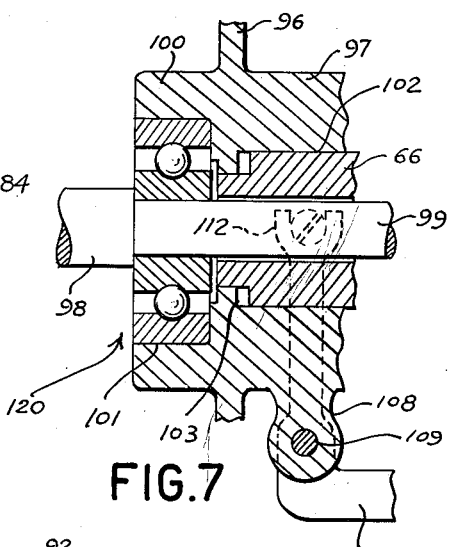
Fig. 7 is a cross-sectional view taken on line 7—7 of Fig. 6.
Figure 5:
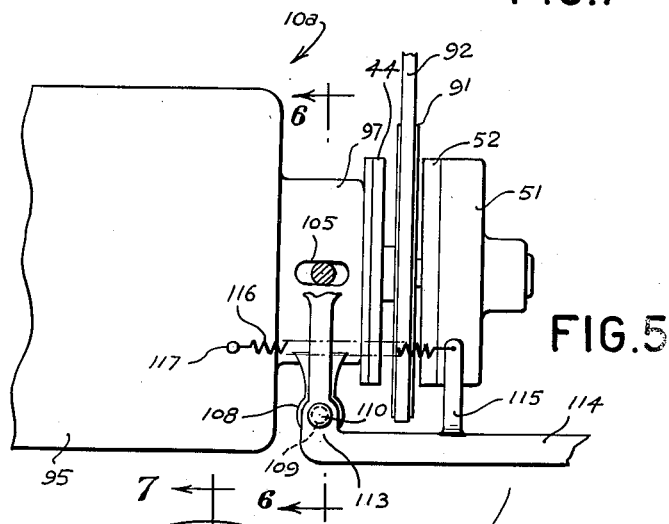
Fig. 5 is a side elevational view of an individual motor drive embodying the invention, and illustrating a modified construction.
Figure 6:
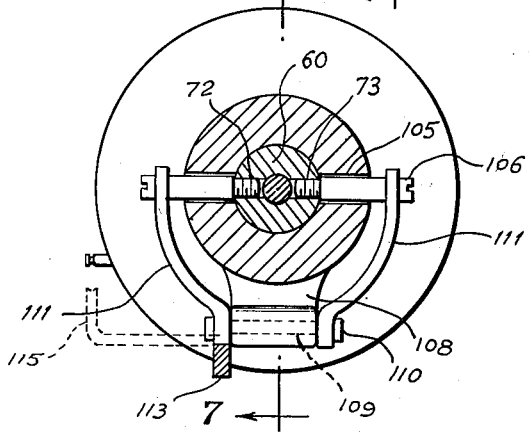
Fig. 6 is a cross-sectional view taken on line 6—6 of Fig. 5.

In Figs. 5, 6 and 7 there is shown an individual motor drive 10a embodying the invention and illustrating a modified construction. The same comprises a motor 95 formed with an end wall 96 at one end. Extending from the end wall 96 is a hub 97. The motor is furthermore provided with an armature shaft 98. Extending from the armature shaft 98 is a co-axial shaft extension or portion 99 of reduced diameter passing through the hub. The hub 97 extends outwardly to the end wall 96. Extending inwardly of the end wall 96 is an annular wall 100, countersunk as at 101. The hub 97 is formed with an axial through opening 102 having a reduced portion 103 extending to the countersunk opening 101. Attached to the outer end of the shaft 99 is a fly wheel 51, similar to the fly wheel of Fig. 3. Attached to the hub 97 is a friction brake 44, similar to the friction brake shown in Fig. 3.

Slidably mounted within the hub 97 is a sleeve 60 similar to the sleeve 60 of Fig. 3. On said sleeve is the pulley 91. Sleeve 60 is formed with diametrically opposed screw threaded openings 72 and 73. The hub 97 is formed at opposite sides thereof with aligned longitudinal slots 105. Screwed into the threaded openings 72 and 73 are oppositely extending pins 106 which project through the slots 105.

The hub 97 is provided, at its lower end, with a downwardly extending boss 108 formed with a horizontal through opening 109 disposed at right angles to the axis of shaft 98. Extending through the opening 109 is a pivot pin 110. Attached to opposite ends of the pin 110 are upwardly extending forked arms 111 each provided at its upper end with a fork 112 engaging an end of pin 106. One of the arms 111 is in the form of a lever having a portion 113 extending below the pin 110; and extending from said portion 113 is an arm 114, which may be attached to a foot pedal or other control. Attached to arm 114 is an upwardly extending pin 115 which projects above the level of the pivot pin 110. The upper end of pin 115 is anchored by a spring 116 to an anchor 117 on the motor. The spring 116 is located above the pivotal axis of pin 110 thereby tending to rotate lever arm 114 in a counterclockwise direction for shifting sleeve 66 to the left to thereby retain the pulley 91 in braked condition. When it is desired to operate the machine which is belted to the pulley 91 by belt 92, lever arm 114 is pulled downwardly, thereby tensioning spring 116 and shifting sleeve 66 to the right for moving pulley 91 into engagement with the friction liner 52 of the fly wheel 51.

Within the countersunk opening 101 is a combination radial and thrust bearing 120 supporting a shaft 99. With such construction the sleeve 66 may have a clearance with shaft 99. The inner radial race of the bearing 120 contacts a shoulder between shaft portions 98 and 99 as shown in Fig. 7 of the drawing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An individual motor drive comprising an electric motor having a hub at one end, a brake on the outer end of said hub, said motor having an armature shaft passing through the hub, a fly wheel on said shaft and beyond the hub, a manually controlled shiftable sleeve within the hub and on said shaft, a pulley rotatably and non-slidably mounted on said sleeve and shiftable therewith, said pulley being located between said brake and said fly wheel, and means to shift said sleeve in one direction into contact with the brake to brake the pulley, and in an opposite direction to engage the pulley with the fly wheel for rotation therewith.

2. In combination, a motor provided with a hub at one end, said motor having an armature shaft passing through said hub exteriorly of the motor said hub having an exposed face transverse of said shaft, a fly wheel at the end of said shaft, a sleeve slidable within said hub, a brake member on the face of said hub, a member rotatably mounted on said sleeve by means of a ball bearing, said member being disposed between the fly wheel and said brake, and means to shift said sleeve for selectively engaging the opposed faces of said member either with the fly wheel or with the brake.

3. In combination, a motor provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, said means including opposite slots formed in said hub member, and means attached to said sleeve and passing through said slots.

4. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, and thrust bearing means to take up thrust when said member is engaged with said fly wheel.

5. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, and combination thrust and radial means interposed between said shaft and motor, and said sleeve having a clearance relative to said shaft.

6. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, said means including opposite slots formed in said hub member, and means attached to said sleeve and passing through said slots, said slots being inclined and so arranged that a line perpendicular to and intersecting the axis of said fly wheel shaft and passing through one of said slots, also passes through the other of said slots.

7. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, and means for normally biasing said rotary member into engagement with said brake.

8. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, thrust bearing means to take up thrust when said member is engaged with said fly wheel, and means for normally biasing said rotary member into engagement with said brake.

9. In combination, a motor comprising a motor casing provided with a hub at one end, said motor having an armature shaft passing through said hub exteriorly of the motor, a fly wheel at the end of said shaft, a sleeve slidable within said hub, a brake member at one end of said hub, a member rotatably mounted on said sleeve by means of a ball bearing, said member being disposed between the fly wheel and said brake, means to shift said sleeve for selectively engaging said member either with the fly wheel or with the brake, said means including opposite slots formed in said hub members, pins attached to said sleeve and passing through said slots, said slots being aligned with one another and oppositely disposed and extending longitudinally of said sleeve, and a fork member pivoted to said motor casing about an axis perpendicular to the axis of said shaft and engaging said pins, and means for rotating said forked member.

10. In combination, a motor including a motor casing and a motor shaft therein and extending beyond said casing, a fly wheel fixed to the shaft and disposed outside of the casing, a tubular jack shaft surrounding said motor shaft, said motor casing having a hub surrounding said jack shaft, said jack shaft being slidably supported within said hub and having a clearance relative to the motor shaft, a pulley rotatably and nonslidably mounted on said jack shaft and located between the fly wheel and the hub of the motor casing.

11. In combination, a motor including a motor casing and a motor shaft therein and extending beyond said casing, a fly wheel fixed to the shaft and disposed outside of the casing, a tubular jack shaft surrounding said motor shaft, said motor casing having a hub surrounding said jack shaft, said jack shaft being slidably supported within said hub and having a clearance relative to the motor shaft, a pulley rotatably and non-slidably mounted on said jack shaft and located between the fly wheel and the hub of the motor casing, and a brake at one end of said hub and located between said pulley and hub.

12. In combination, a motor including a motor casing and a motor shaft therein and extending beyond said casing, a fly wheel fixed to the shaft and disposed outside of the casing, a tubular jack shaft surrounding said motor shaft, said motor casing having a hub surrounding said jack shaft, said jack shaft being slidably supported within said hub and having a clearance relative to the motor shaft, a pulley rotatably and non-slidably mounted on said jack shaft and located between the fly wheel and the hub of the motor casing, and a brake at one end of said hub and located between said pulley and hub, and means for shifting said pulley in one direction toward the fly wheel and in an opposite direction toward the brake.

13. In combination, a motor comprising a motor casing and motor shaft therein and extending beyond said casing, a driving member fixed on the shaft and disposed outside of the casing, a tubular jack shaft surrounding the motor shaft and located wholly within the motor casing, and means on the motor casing to support said jack shaft for sliding movement, said jack shaft having a clearance relative to the motor shaft, a driven wheel mounted for rotation on said jack shaft but slidable therewith and located between the driving wheel and the motor casing, a brake on said motor casing and between the driven wheel and said casing, and means for shifting said driven wheel in one direction toward the driving wheel and in an opposite direction toward the brake.

WILLIAM H. LEWIN.

REFERENCES CITED

The following references are of record in the file of this patent:

UNITED STATES PATENTS

| Number | Name | Date |
|---|---|---|
| 1,042,090 | Covell | Oct. 22, 1912 |
| 1,382,133 | Spencer et al. | June 21, 1921 |
| 1,544,080 | Voigt | June 30, 1925 |
| 1,756,576 | Voigt | Apr. 29, 1930 |
| 1,879,546 | Seibert et al. | Sept. 27, 1932 |
| 2,037,644 | Voigt | Apr. 14, 1936 |
| 2,250,981 | Abel | July 29, 1941 |
| 2,269,788 | Schenk | Jan. 13, 1942 |
| 2,274,457 | Peets et al. | Feb. 24, 1942 |

FOREIGN PATENTS

| Number | Country | Date |
|---|---|---|
| 761,185 | France | Jan. 3, 1934 |